(12) United States Patent
Ruppel et al.

(10) Patent No.: US 11,409,617 B2
(45) Date of Patent: Aug. 9, 2022

(54) HARDWARE BIT-VECTOR TECHNIQUES

(71) Applicant: Arm Limited, Cambridge (GB)

(72) Inventors: Emily Kathryn Ruppel, Pittsburgh, PA (US); Supreet Jeloka, Austin, TX (US); Parameshwarappa Anand Kumar Savanth, Cambridge (GB); Wei Wang, Cambridge (GB)

(73) Assignee: Arm Limited, Cambridge (GB)

( * ) Notice: Subject to any disclaimer, the term of this patent is extended or adjusted under 35 U.S.C. 154(b) by 258 days.

(21) Appl. No.: 16/882,402

(22) Filed: May 22, 2020

(65) Prior Publication Data

US 2021/0365092 A1    Nov. 25, 2021

(51) Int. Cl.
| | |
|---|---|
| *G06F 11/00* | (2006.01) |
| *G06F 11/14* | (2006.01) |
| *H02J 50/00* | (2016.01) |
| *G06F 1/26* | (2006.01) |

(52) U.S. Cl.
CPC ............ *G06F 11/1471* (2013.01); *G06F 1/26* (2013.01); *H02J 50/001* (2020.01); *G06F 2201/84* (2013.01)

(58) Field of Classification Search
CPC .... G06F 1/26; G06F 11/1471; G06F 2201/84; H02J 50/001
See application file for complete search history.

(56) References Cited

U.S. PATENT DOCUMENTS

| | | | |
|---|---|---|---|
| 2012/0151253 A1* | 6/2012 | Horn ................... | G06F 12/0804 711/E12.001 |
| 2016/0042039 A1* | 2/2016 | Kaufmann .......... | G06F 16/2456 707/722 |
| 2016/0127875 A1* | 5/2016 | Zampini, II ...... | H04W 52/0296 370/311 |
| 2018/0285241 A1 | 10/2018 | Lucia et al. | |
| 2019/0132815 A1* | 5/2019 | Zampini, II ........... | G06Q 50/06 |
| 2019/0190271 A1* | 6/2019 | Hua ......................... | H02J 7/00 |
| 2020/0327019 A1* | 10/2020 | Chung ................ | G06F 11/1438 |
| 2021/0126179 A1* | 4/2021 | Manousakis ............ | G06F 1/206 |
| 2021/0162950 A1* | 6/2021 | Larsen ................... | B60R 25/34 |

OTHER PUBLICATIONS

PCT International Search Report and Written Opinion; PCT/GB2021/051178; dated Nov. 5, 2021.
PCT Partial International Search Report and Written Opinion; PCT/GB2021/051178; dated Sep. 10, 2021.
Colin, et al.; A Reconfigurable Energy Storage Architecture for Energy-Harvesting Devices; ASPLOS '18; pp. 767-781; Mar. 19, 2018. DOI: 10.1145/3173162.3173210.

(Continued)

*Primary Examiner* — Joshua P Lottich
(74) *Attorney, Agent, or Firm* — Pramudji Law Group PLLC; Ari Pramudji

(57) ABSTRACT

Various implementations described herein are related to a device having energy harvesting circuitry that experiences power failures. The device may include computing circuitry having a processor coupled to the energy harvesting circuitry. The processor may be configured to reduce a number of write operations to a log structure having a hardware bit-vector used by the computing circuitry to boost computational progress even with the power failures.

20 Claims, 8 Drawing Sheets

(56) References Cited

OTHER PUBLICATIONS

Kannan, et al.; Energy Aware Persistence: Reducing Overheads of Memory-Based Persistance in NVMs PACT '16; pp. 165-177; Sep. 11, 2016. DOI: 10.1145/2967938.2967953.

Maeng, et al.; Adaptive Dynamic Checkpointing for Safe Efficient Intermittent Computing; 13th USENIX Symposium on Operating Systems Design and Implementation (OSDI '18); pp. 129-144; Oct. 2018.

Lucia, et al.; A Simpler, Safer Programming and Execution Model for Intermittent Systems; Proceedings of the 36th ACM SIGPLAN Conference on Programming Language Design and Implementation (PLDI '15); pp. 575-585 Jun. 2015. DOI: 10.1145/2737924.2737978.

* cited by examiner

Different paths through an application provide different logging results.

If path_A (1->2->5->6) is taken, then both X and Y are logged once.

If path_B (1->3->5->6) is taken, then Y is logged only once.

Also, Z is not logged in either path_A or path_B of program flow.

300C

Test and Log Sequence 308 volatile bit-vector 312

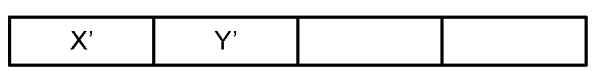

checkpoint ( )
if (Z > 0)
    X++
else
    Y++ volatile bit-vector 314

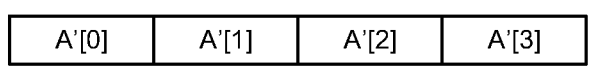

checkpoint ( )
for (i = 0; i < 10; i++)
    A[i] = X + Y
checkpoint ( )

Each word written between checkpoints is assigned a bit in a bit-vector.

318 {
    test_and_log ( X, X' ) :
        if ( bit_vector [ X' ] == 0 ) :
            log ( X )
            bit_vector [ X' ] = 1

(1) Pseudo-code for test_and_log function.

(2) X is the address of the variable to be logged.

(3) X' is the corresponding bit in the bit-vector.

(4) X' will be provided by the compiler.

FIG. 3C

HARDWARE BIT-VECTOR TECHNIQUES

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In remote applications, battery-less energy-harvesting sensors tend to operate intermittently as energy is available. In the event of a power failure, a program state may be restored on reboot when energy is available. These unreliable devices tend to perform long, complex applications inefficiently during times of frequent power failures. To ensure that memory remains consistent with various volatile program states, there exists a need to efficiently restore program states without compromising processing integrity.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

FIGS. 3A-3C illustrate diagrams of various log sequences in accordance with implementations described herein.

DETAILED DESCRIPTION

Various implementations described herein are directed to hardware bit-vector schemes and techniques for various physical design applications, such as, e.g., energy harvesting applications. For instance, various schemes and techniques described herein may provide a compiler-mapped hardware bit-vector for software log filtering to improve energy efficiency in various physical design applications. Also, the various schemes and techniques described herein provide a method to reduce a number of write operations to a software log structure stored in non-volatile memory (NVM) as used by various energy-harvesting devices that tend to experience frequent power failures. In some instances, reducing write operations may refer to filtering writes to a log or log structure that is stored in persistent memory, such as, e.g., random access memory (RAM).

In some instances, energy-harvesting devices operate intermittently as energy is available, and these devices may use persistent memory to checkpoint the state of the program so that in the event of a power failure, the state may be restored on reboot when energy is available. Incrementally checkpointing progress allows these unreliable devices to perform long, complex applications. Thus, to efficiently ensure that persistent memory remains consistent with volatile states of a program, an efficient logging scheme may be used so that writes to persistent memory may be reverted. As such, the various schemes and techniques described herein may combine compiler analysis along with a hardware bit-vector stored in volatile memory to efficiently enable undo-logging. In some instances, undo-logging described herein may write an address and a value of a persistent memory location to a persistent log for each and every write to persistent memory, and also, this technique may only provide logging on a first write after a checkpoint.

In some implementations, the hardware bit-vector described herein may refer to a status flag register, and the hardware bit-vector may be stored in volatile memory so as to be cleared after checkpoint. Also, the hardware bit-vector may be used for tracking program states between checkpoints. Thus, various schemes and techniques described herein use hardware assisted logging with a bit-vector and compiler analysis, wherein the compiler pass statically maps from objects to bits in a hardware bit-vector, and also, the hardware bit-vector may be used to filter writes to a log stored in persistent memory.

Various implementations of hardware bit-vector schemes and techniques will be described in detail herein with reference to FIGS. 1A-5.

Figure 1A:
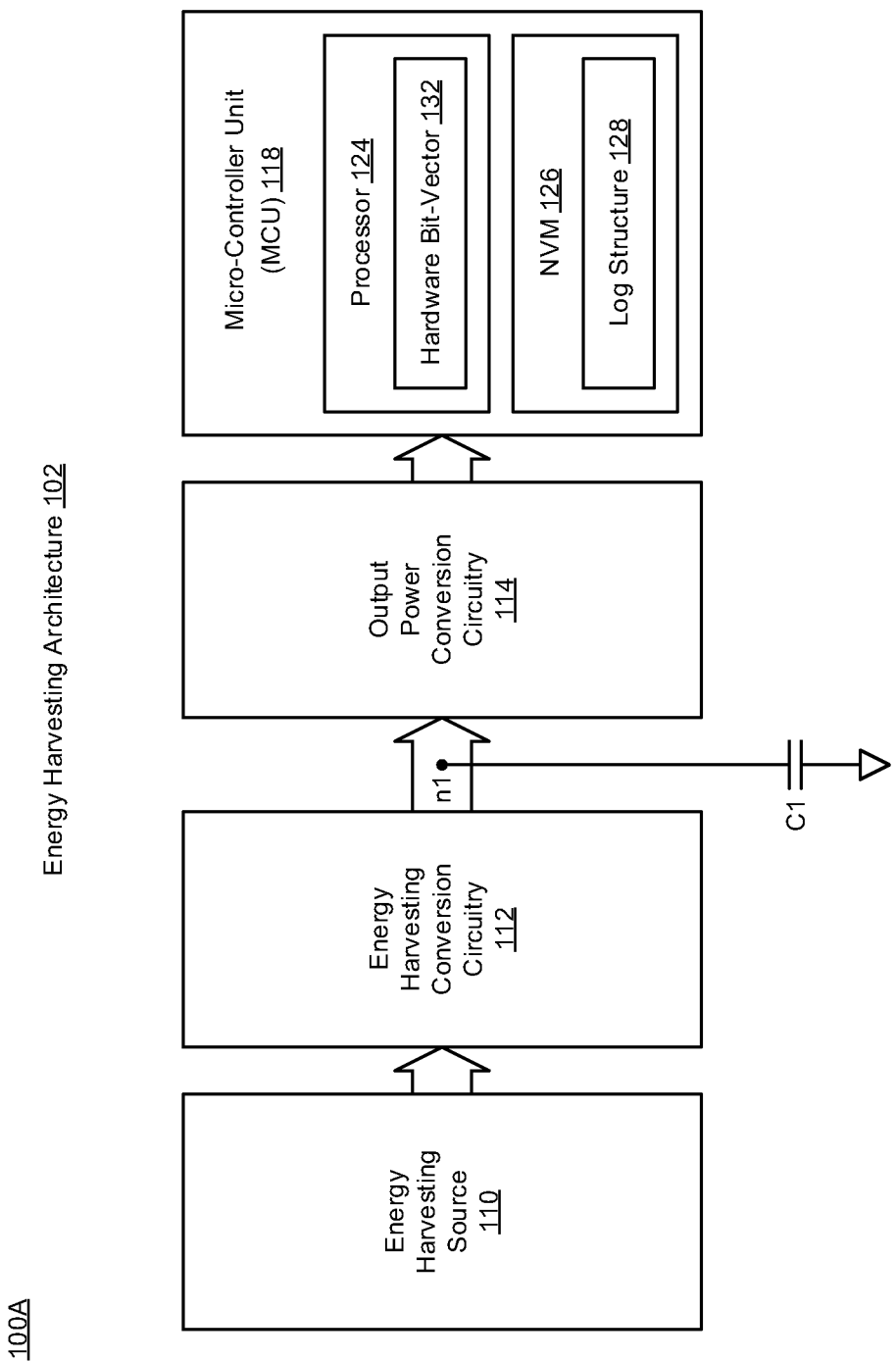
FIG. 1A illustrates a diagram of energy harvesting architecture in accordance with various implementations described herein.

FIG. 1A illustrates a schematic diagram of energy harvesting architecture 102 in accordance with various implementations described herein.

In various implementations, the energy harvesting architecture 102 may refer to a system or device having various integrated circuit (IC) components that are arranged and coupled together as an assemblage or combination of parts that provide for a physical circuit design and related structures. In some instances, a method of designing, providing and building the energy harvesting architecture 102 as an integrated system and/or device that may be implemented with various IC circuit components is described herein so as to implement hardware bit-vector schemes and techniques associated therewith. Also, the energy harvesting architecture 102 may be integrated with hardware bit-vector computing circuitry and related components on a single chip, and the energy harvesting architecture 102 may be implemented in various embedded systems for automotive, electronic, mobile and Internet-of-things (IoT) applications, including remote sensor nodes.

As shown in FIG. 1A, the energy harvesting architecture 102 includes energy harvesting circuitry 112 that experiences frequent power failures. The energy harvesting circuitry 112 may be coupled to an energy harvesting source 110, and also, the energy harvesting circuitry 112 may be coupled to output power conversion circuitry 114 that is configured to provide a source voltage to computing circuitry 118, such as, e.g., a micro-controller unit (MCU). In some implementations, the energy harvesting architecture 102 may refer to a battery-less energy harvesting sensor that operates intermittently when energy is available for harvesting and/or for producing power for the computing circuitry 118 including a processor 124 associated therewith. Also, the output power conversion circuitry 114 may be coupled to the energy harvesting circuitry 112 and the computing circuitry 118 (MCU), and the output power conversion circuitry 112 may be configured to convert energy harvested by the energy harvesting circuitry 112 to power (e.g., battery power) for use by the computing circuitry 118 (MCU) and the processor 124. Also, in some instances, the computing circuitry 118 (MCU) and/or the processor 124 may be driven directly from the energy harvesting source 110.

Also, as shown in FIG. 1A, the energy harvesting architecture 102 may have the computing circuitry 118 (MCU). In some instances, the computing circuitry 118 (MCU) may include the processor 124, which may be coupled to the energy harvesting circuitry 112 via the output power conversion circuitry 114. The processor 124 may be configured to reduce a number of write operations to a log structure 128 within non-volatile memory (NVM) 126, and a hardware bit-vector 132 may be used by the energy-harvesting circuitry 112 to compel (i.e., boost, bolster, provide, induce, urge, sustain, or similar) computational progress despite (i.e., even with) the frequent power failures. In some instances, reducing write operations includes filtering writes to the log structure 128. The computing circuitry 118 (MCU) may include the non-volatile memory (NVM) that is used as persistent memory to provide a checkpoint for one or more program states so that the one or more program states are restored when power is available during energy harvesting. In some instances, the NVM 126 may include the log structure 128, and also, the processor 124 may include the hardware bit-vector 132. However, in other instances, the hardware bit-vector 132 may be disposed within volatile memory that is outside of the processor 124. In some instances, a capacitance (C1) is provided between the energy harvesting circuitry 112 and the output power conversion circuitry 114, and also, the capacitance (C1) is coupled between node (n1) and ground (Gnd).

In some implementations, the log structure 128 may be used to ensure that the checkpoint remains consistent with respect to the one or more program states, and also, the log structure 128 may be used to ensure that the number of write operations are restorable by writing to the hardware bit-vector 132. In some instances, the hardware bit-vector 132 may be stored in a register so as to enable undo-logging, wherein the number of write operations has a first write operation, and wherein the undo-logging is only used on the first write operation after a checkpoint. Also, the first write operation may be write-specific to at least one variable associated with the first write operation. Also, in some instances, the hardware bit-vector may be configured to track the one or more program states between multiple checkpoints. In some instances, the hardware bit-vector 132 may refer to a compiler mapped, status flag register for software log filtering of one or more program states during execution of the number of write operations. Various other aspects associated with the log structure, registers and the hardware bit-vector will be described in greater detail herein below in reference to FIG. 2.

Figure 1B:
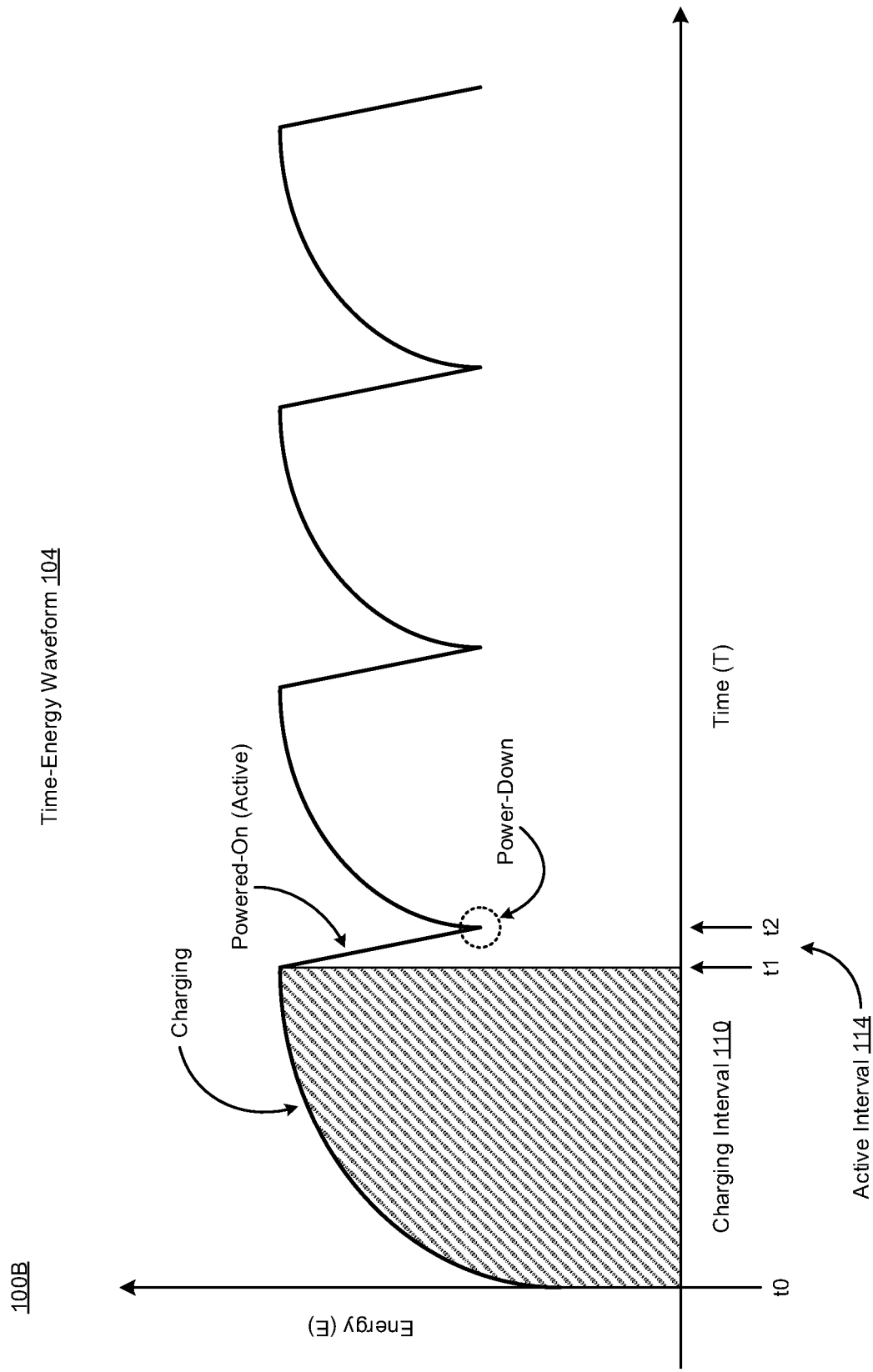
FIG. 1B illustrates a waveform diagram of time-energy curves in accordance with various implementations described herein.

FIG. 1B illustrates a waveform diagram 100B of time-energy curves 104 in accordance with various implementations described herein. The waveform diagram 100B of FIG. 1B is described herein below in reference to FIG. 1A.

As shown in FIG. 1B, the waveform diagram 100B shows various graphical representations of battery-less, energy harvesting devices that operate intermittently. For instance, energy harvesting devices may alternate between charging periods (e.g., during a charging interval from t0 to t1) and powered-on periods (e.g., during an active interval from t1 to t2). In some instances, e.g., at time t2, the energy harvesting device may switch from the descending slope of attenuating power to another charging interval starting at a power-down point. Thus, as shown in FIG. 1B, the energy harvesting device operates in multiple charging/powered-on cycles or intervals during regular activity. In addition, as described herein, various software related processes associated with operation of energy harvesting devices may also execute intermittently.

Figure 2:
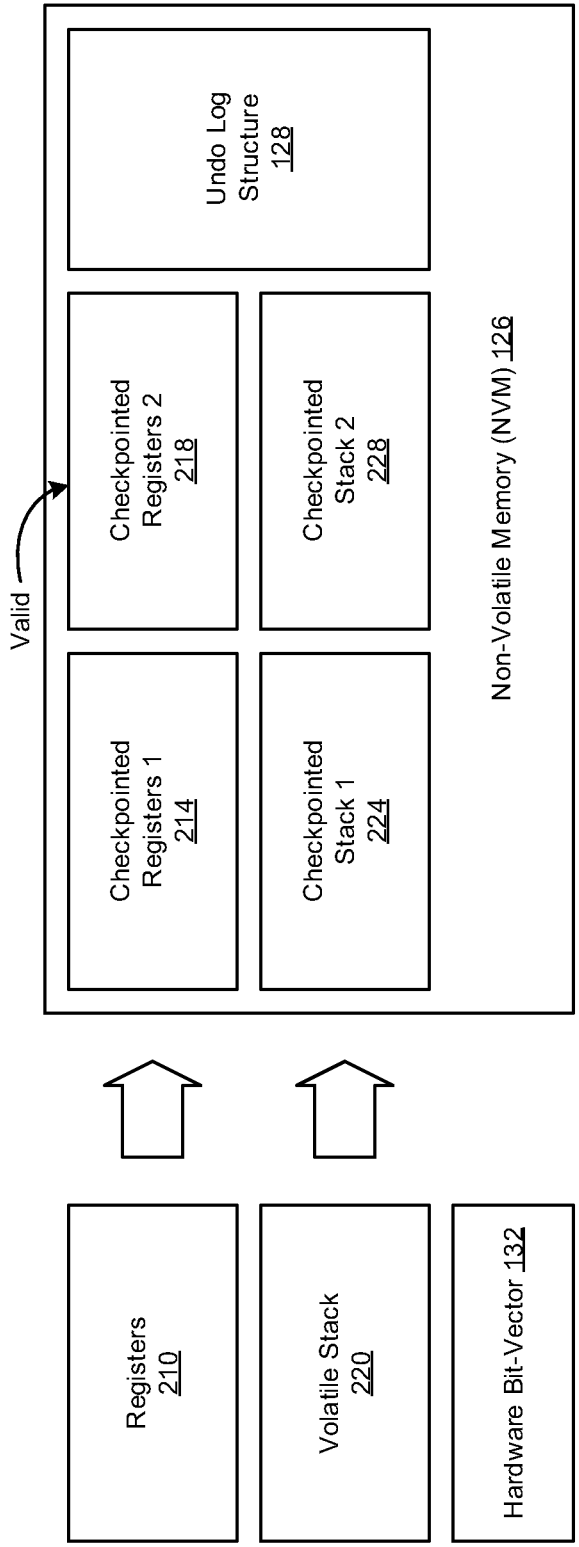
FIG. 2 illustrates a schematic diagram of memory architecture in accordance with various implementations described herein.

FIG. 2 illustrates a diagram 200 of memory architecture 202 in accordance with various implementations described herein. In some instances, as shown in FIG. 2, the memory architecture 202 may include various additional structures that may be added to the non-volatile memory (NVM) 126 of FIG. 1A.

In various implementations, the memory architecture 202 may refer to a system or device having various integrated circuit (IC) components that are arranged and coupled together as an assemblage or as a combination of parts that provide for a physical circuit design and related structures. In some instances, a method of designing, providing and building the memory architecture 202 as an integrated system or device implemented with various IC circuit components is described herein so as to implement various hardware bit-vector schemes and techniques associated therewith. Also, the memory architecture 202 may be integrated with various hardware bit-vector computing circuitry and related components on a single chip, and the memory architecture 202 may be implemented in various embedded systems for automotive, electronic, mobile and Internet-of-things (IoT) applications, including remote sensor node applications.

As shown in FIG. 2, the memory architecture 202 may include NVM circuitry 126 having memory cells that are arranged in columns and rows and are also accessible via the columns and rows. The NVM circuitry 126 may be adapted to store or record data and information associated with checkpoints and various other software related data and information used by the processor 124 (e.g., in FIG. 1A).

Also, in some instances, the memory architecture 202 may have registers 210 (e.g., store registers) and a volatile stack 220 that may be used at each checkpoint during execution of an instruction sequence. In other instances, the memory architecture may include a volatile heap, and other data sections. Also, the registers 210 may refer to first checkpoint registers 214 and/or second checkpoint registers 218, and the volatile stack 220 may refer to a first checkpoint stack 224 and/or a second checkpoint stack 228 that may be used to process checkpoint values and associated variables during execution of various software processes including, e.g., instruction sequences related to hardware bit-vector schemes and techniques described herein.

Further, the memory architecture 202 may use the log structure 128 (e.g., in FIG. 1A) as an undo log structure along with the hardware bit-vector 132 (e.g., in FIG. 1A) for performing undo-logging activities for one or more or all NVM write operations. In some operational on-boot activities, the processor 124 may be configured to interact (or interface) with the memory architecture 202 and the various components thereof to restore registers, stack the log structure, and/or replay the log structure. Also, in some instances, there are two checkpointed registers for both register 214, 218 and stack 224, 228, and in some cases only one of these may be valid. For instance, in reference to the executed process of checkpointing, the power may be lost, and as such, any previous checkpoints should be saved (or stored) and should not be discarded. After the new checkpoint is complete, valid pointers should be moved from previous checkpoints to new checkpoints so as to maintain (or sustain) the program state for restoration. Thus, in some instances, a valid reference point may refer to a valid pointer for indicating which checkpoint copy is reverted to.

In summary, the memory architecture 202 may be used by the processor 124 (e.g., in FIG. 1A) to (1) store registers and stack at each checkpoint, (2) perform undo-logging for each NVM write operation, and (3) on boot-up, restore the registers and stack, and then replay the log. These features and various other aspects associated with the log structure 128, the registers 210 and the hardware bit-vector 132 will be described in greater detail herein below in reference to FIG. 3A-3C.

Figure 3A:
Figure 3B:
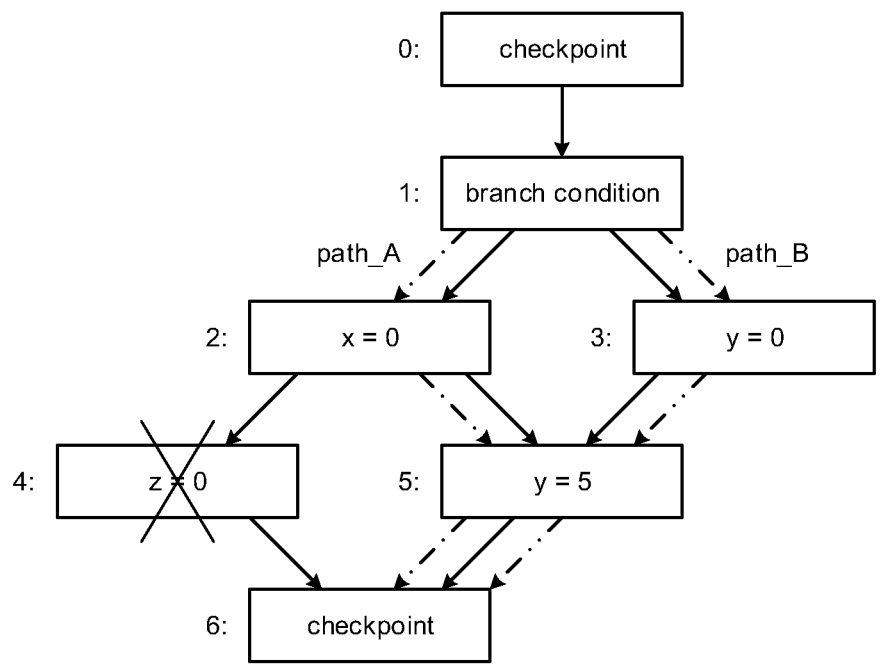

FIGS. 3A-3C illustrate diagrams of various log sequences in accordance with various implementations described herein. In particular, FIG. 3A shows a diagram 300A of a log sequence 302 associated with an instruction sequence in a software program, and also, FIG. 3B shows a diagram 300B of a log sequence 304 associated with one or more log paths for the instruction sequence of the software program. Further, FIG. 3C refers to a diagram 300C of a test-and-log sequence 308 associated with checkpoints for the instruction sequence of the software program.

In various implementations, due to intermittent software activity, software used in energy harvesting devices may be configured to provide forward progress and memory consistency. For instance, the undo log structure 128 and the non-volatile memory (NVM) 126 may be used to track the address variables and values associated therewith. Also, in some instances, a previous value may be logged (or recorded) in a persistent log, a new value may be logged (or recorded) to the NVM location, and/or a log entry may be performed in the NVM location for each write operation.

As shown in FIG. 3A, the log sequence 302 may refer to a software program (main) that provides for a checkpoint variable, a y-sense variable, and an x-count variable that equals the y-sense variable plus one (i.e., x=y+1). In some implementations, the checkpoint may be reinstated when power returns during an active cycle.

In some instances, the undo log structure 128 may include an address (Addr) along with a corresponding value (Value) associated therewith. For instance, the address pointing to the y-variable may have a value of 0, and also, the address pointing to the x-variable may have a value of 0. Then, the y-variable may be given the value of 10. In the NVM 126, the address pointing to the y-variable may have a value of 10, and the address pointing to the x-variable may have a value of 11 (or 0, or 15).

In summary, the log sequence 302 may be used by the processor 124 (e.g., in FIG. 1A) to (1) record a previous value in a persistent log, (2) write a new value to an NVM location, and (3) provide entry for each NVM write operation.

As shown in FIG. 3B, the log sequence 304 may refer to various execution paths associated with the instruction sequence of the software program. For instance, in some applications, the execution paths may refer to a first execution path (path_A) associated with a first path sequence (1→2→5→6), and also, the execution paths may refer to a second log path (path_B) associated with a second path sequence (1→3→5→6). Thus, in various instances, the log sequence 304 may refer to various program execution sequences for various possible execution paths, such as, e.g., Path_A (1→2→5→6) and/or Path_B (1→3→5→6).

In some instances, the first execution path (path_A) may refer to a first path sequence (1→2→5→6), wherein from the checkpoint (at line 0), the execution path initiates (branch condition at line 1), and path_A proceeds to set x=0 (at line 2). Next, the execution path (path_A) bypasses setting z=0 (at line 4), proceeds to set y=5 (at line 5), and proceeds to next checkpoint (at line 6). Thus, the execution path_A provides the first path sequence (1→2→5→6).

In some instances, the second execution path (path_B) may refer to a second path sequence (1→3→5→6), wherein from the checkpoint (at line 0), the execution path initiates (branch condition at line 1), and path_B proceeds to set y=0 (at line 3). Next, the execution path (path_B) bypasses setting z=0 (at line 4), proceeds to update y=5 (at line 5), and proceeds to next checkpoint (at line 6). Thus, the execution path_B provides the second path sequence (1→3→5→6).

In summary, the log sequence 304 may be used by the processor 124 (e.g., in FIG. 1A) to direct the instruction sequence of the software program in different paths of an application that may provide different logging results. In some instances, if path_A (1→2→5→6) is taken, then both x and y may be logged once. In other instances, if path_B (1→3→5→6) is taken, then y may be logged only once. Further, z may not be logged in either path_A or path_B in reference to the program flow.

In some instances, FIG. 3B shows an example control-flow diagram between two checkpoints and highlights two possible paths through the code. With software-only static logging, the application would need to record X, Y and Z in the log, and there is no path through the application that requires all three variables to be logged. With software-only dynamic logging, along path_A, only X and Y would need to be logged, and along path B, Y would be logged unnecessarily a second time. With hardware assisted logging as described herein, the application is configured to log a minimum number of variables regardless of the path through the application.

As shown in FIG. 3C, the test-and-log sequence 308 may be associated with various checkpoints for the instruction sequence of the software program. The test-and-log sequence 308 may be associated with a volatile bit-vector 312 (hardware bit-vector) and another volatile bit-vector (hardware bit-vector) 314. In some instances, the volatile bit-vector 312 may refer to a 4-bit vector, wherein a first bit (X') in the 4-bit vector may be used as a flag-bit for the x-variable, and a second bit (Y') in the 4-bit vector may be used for the y-variable. Also, in some instances, the volatile bit-vector 314 may refer to a 4-bit vector, wherein a first bit (A'[0]) in the 4-bit vector may be used as a flag for a first address (A[0]), a second bit (A'[1]) in the 4-bit vector may be used as a flag for a second address (A[1]), a third bit (A'[2]) in the 4-bit vector may be used as a flag for a third address (A[2]), and a fourth bit (A'[3]) in the 4-bit vector may be used as a flag for a fourth address (A[3]).

In some instances, the test-and-log sequence 308 may provide for one or more checkpoint variables and/or conditional statements associated with variables (X, Y, X) and an address pointer. For instance, in a first checkpoint instruction sequence for the volatile bit-vector 312, if Z>0, then X++, else Y++. In another instance, in a second checkpoint instruction sequence for the volatile bit-vector 314, for each address (i), A[i]=X+Y, another checkpoint is established before processing the next address A[i].

In some instances, each word (such as, e.g., variables for x, y, A[0], etc.) written between checkpoints may be assigned a bit in a bit vector, such as, e.g., the volatile bit vector 312 (or hardware bit-vector). As shown in FIG. 3C, the test-and-log sequence 308 may refer to a software program 318 that provides for a bit-vector x-variable (X'). For instance, the test-and-log function (X,X') provides a conditional statement that, if bit-vector (X')==0, then log (X), and set the bit-vector (X')=1.

In summary, the test-and-log sequence 308 may be used by the processor 124 (e.g., in FIG. 1A) to (1) use pseudo-code for the test-and-log function, (2) set the variable (X) as the address of the variable to be logged, (3) set (X') as the corresponding bit in the bit-vector, and (4) use (X') as the bit-vector for the memory compiler.

In some implementations, for each checkpoint, compiler analysis may be used to identify the variables stored in persistent memory that could be written before the next checkpoint, and the compiler may assign a bit in the hardware bit-vector to each persistent variable. The variables may be reassigned for each checkpoint as shown in FIG. 3C, and the compiler may only analyze (verify or check) variables stored in persistent memory (i.e., variables that are not on the volatile stack), since the stack will be persisted using a checkpointing mechanism. Since this analysis is static, these bit-vector techniques have several options if a variable is assigned to every bit in the bit-vector (i.e., the bit-vector is full). In various instances, the bit-vector techniques described herein may warn the programmer that the bit-vector is full and throw an error, fall back to inserting dynamic logging calls at each access, and/or automatically inserting a checkpoint.

The bit-vector techniques described herein may rely on compiler analysis and, as such, may reduce compiler complexity. Instead of calculating all possible first writes to each non-volatile memory location that could be written, the compiler may only need to find the set the memory locations that could be written. In addition, each word that could be written between checkpoints may be assigned a bit in the bit-vector. In certain cases, after each variable is assigned, the compiler augments every store to a variable stored in persistent memory with a call to the test-and-log function that reads the bit-vector and updates the undo log if the bit-vector is not set, as shown in FIG. 3C. In some implementations, the test-and-log function takes the address of the variable to be logged and the corresponding index into the bit-vector. This bit-vector technique may be used to prevent the application from conservatively logging variables that have already been written.

Figure 4:
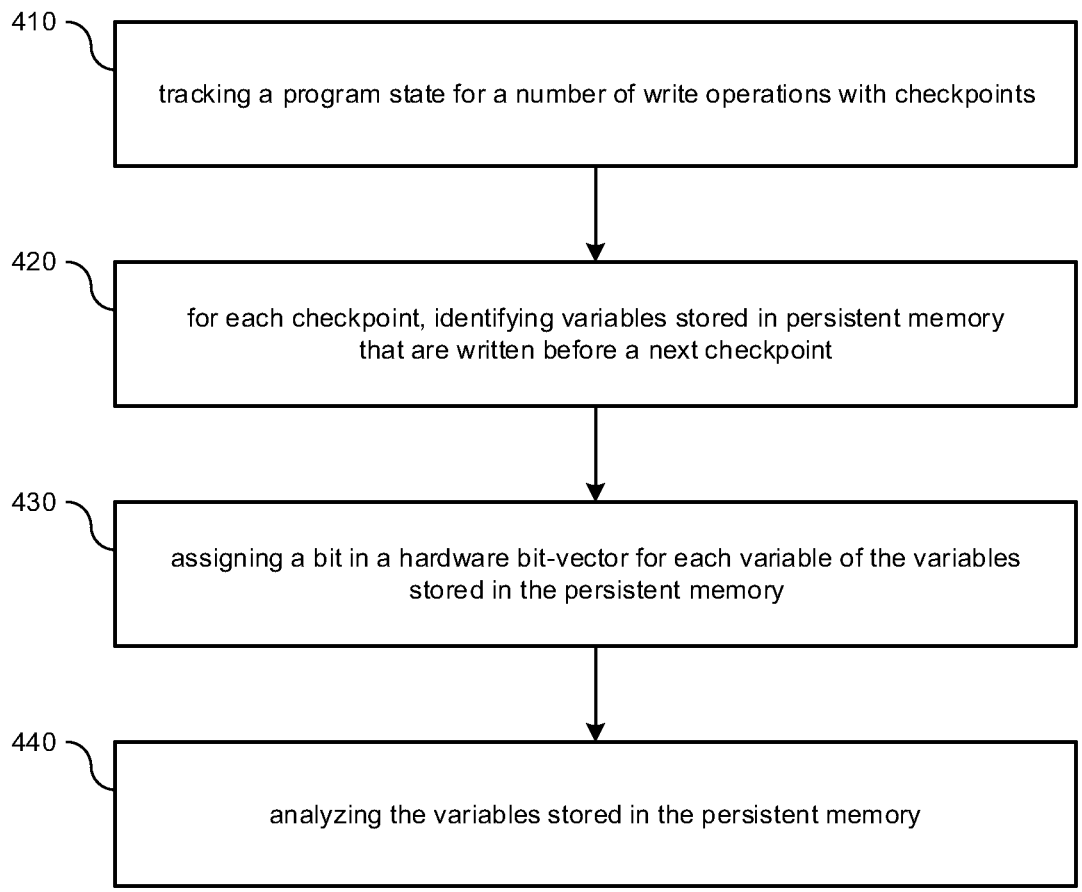
FIG. 4 illustrates a process flow diagram of a method for providing hardware bit-vector techniques in accordance with implementations described herein.

FIG. 4 illustrates a process diagram of a method 400 for providing hardware bit-vector techniques in accordance with implementations described herein.

It should be understood that even though method 400 may indicate a particular order of operation execution, in some cases, various portions of the operations may be executed in a different order, and on different systems. In other cases, other operations and/or steps may be added to and/or omitted from method 400. Also, method 400 may be implemented in hardware and/or software. If implemented in hardware, method 400 may be implemented with components and/or circuitry, as described herein in reference to FIGS. 1A-3C. Also, if implemented in software, method 400 may be implemented as a program and/or software instruction process that is configured for providing hardware bit-vector schemes and techniques described herein. Also, if implemented in software, instructions related to implementing method 400 may be recorded in memory and/or a database. For instance, various types of computing devices having at least one processor and memory may be configured to perform method 400. Also, in some instances, method 400 may be performed by a compiler.

In various implementations, method 400 may refer to a method of designing, providing, building, fabricating and/or manufacturing hardware bit-vector architecture as an integrated system, device and/or circuitry that may involve use of the various circuit components described herein so as to implement various hardware bit-vector schemes and techniques associated therewith. In some implementations, the hardware bit-vector architecture may be integrated with computing circuitry and various related components on a single chip, and also, the hardware bit-vector architecture may be implemented in various embedded chip-level systems for various electronic, mobile and Internet-of-things (IoT) applications, including sensor node applications.

At block 410, method 400 may track one or more program states for a number of write operations with checkpoints. At block 420, method 400 may identify variables for each checkpoint, wherein the variables are stored in persistent memory, and wherein the variables are written before a next checkpoint. The persistent memory may refer to non-volatile memory (NVM) that is used to provide the checkpoints for each program state.

At block 430, method 400 may assign a bit in a hardware bit-vector for each variable of the variables stored in the persistent memory. In some instances, assigning the bit in the hardware bit-vector for each variable of the variables may refer to mapping each variable of the variables to the bits in the hardware bit-vector. In some instances, assigning the bit in the hardware bit-vector for each variable of the variables may refer to using the hardware bit-vector to filter the number of write operations with respect to a log structure stored in the persistent memory. In some instances, the hardware bit-vector may be stored in a register so as to enable undo-logging, wherein the number of write operations has a first write operation, and wherein the undo-logging is only used on the first write operation after encountering a checkpoint. In some instances, the hardware bit-vector may refer to a compiler mapped, status flag register for software log filtering of each program state during execution of the number of write operations.

Also, at block 440, method 400 may further analyze, verify and/or check the variables stored in the persistent memory, e.g., after assigning the bit in the hardware bit vector. Also, in some instances, in reference to verifying variables stored in the persistent memory, method 400 may include calling a test-and-log function that reads the hardware bit-vector and updates an undo log if the hardware bit-vector is not set. The test-and-log function may obtain an address of each variable to be logged and a corresponding index into the hardware bit-vector. The test-and-log function may refer to various instructions in an instruction sequence that is provided by instruction set architecture (ISA) associated with a processor. In some implementations, ISA refers to computing architecture, and a realization of the ISA, such as, e.g., a micro-processing unit (MPU), may be referred to as an implementation. Also, the ISA may define various supported data types along with registers and/or hardware support for managing main memory fundamental features (e.g., memory consistency, addressing modes and virtual memory), and the input/output (IO) model of a family of implementations of the ISA.

Figure 5:
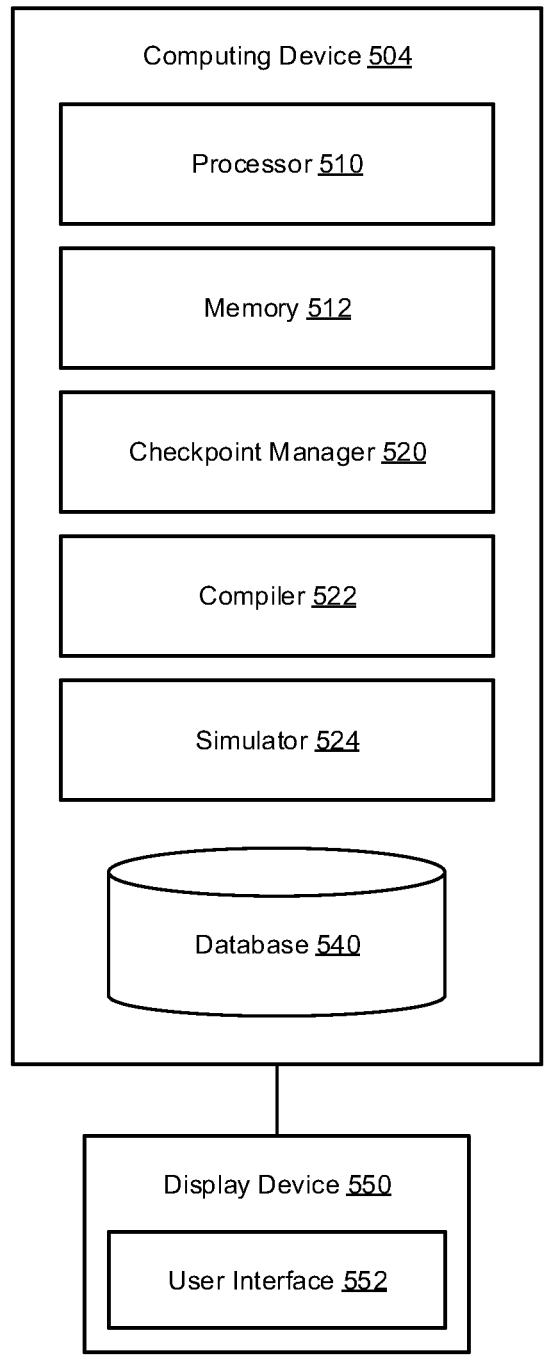
FIG. 5 illustrates a diagram of a computing system for providing hardware bit-vector techniques in accordance with implementations described herein.

FIG. 5 illustrates a diagram of a system 500 for providing hardware bit-vector techniques in accordance with implementations described herein.

In reference to FIG. 5, the system 500 may be associated with at least one computing device 504 that is implemented as a special purpose machine configured for implementing hardware bit-vector techniques in physical design, as described herein. In some instances, the computing device 504 may include any standard element(s) and/or component(s), including at least one processor(s) 510, memory 512 (e.g., non-transitory computer-readable storage medium), one or more database(s) 540, power, peripherals, and various other computing elements and/or components that may not be specifically shown in FIG. 5. The computing device 504 may include instructions recorded or stored on the non-transitory computer-readable medium 512 that are executable by the at least one processor 510. The computing device 504 may be associated with a display device 550 (e.g., a monitor or other display) that may be used to provide a user interface (UI) 552, such as, e.g., a graphical user interface (GUI). In some instances, the UI 552 may be used to receive parameters and/or preferences from a user for managing, operating, and/or controlling the computing device 504. Thus, the computing device 504 may include the display device 550 for providing various output to a user, and the display device 550 may include the UI 552 for receiving input from the user.

In some implementations, the system 500 (or the computing device 504) may refer to a battery-less energy harvesting sensor that operates intermittently when energy is available for harvesting and for producing power for the at least one processor 510 and the memory 512. Also, the battery-less energy harvesting sensor may be implemented as a remote device that operates independently from any other device.

In some implementations, as shown in FIG. 5, the computing device 504 may include a checkpoint manager 520 that is configured to cause the at least one processor 510 to implement one or more or all hardware bit-vector design schemes and techniques described herein in reference to FIGS. 1A-4, including implementing integrated circuitry in physical design. The checkpoint manager 520 may be implemented in hardware and/or software. For instance, if implemented in software, the checkpoint manager 520 may be stored in memory 512 and/or database 540. Also, in some instances, if implemented in hardware, the checkpoint manager 520 may refer to a separate processing component configured to interface with the processor 510.

In some instances, the checkpoint manager 520 is configured to cause the at least one processor 510 to perform various operations, as provided herein in reference to hardware bit-vector schemes and techniques described in FIGS. 1A-4. The memory 512 has stored thereon instructions that, when executed by the processor 510, cause the processor 510 to perform one or more or all of the following operations.

For instance, the checkpoint manager 520 may be configured to cause the at least one processor 510 to perform a method operation of tracking program states for a number of write operations with checkpoints. In some instances, the checkpoint manager 520 may be configured to cause the at least one processor 510 to perform a method operation of identifying variables for each checkpoint, wherein the variables are stored in memory, and wherein the variables are written before a next checkpoint. Also, in some instances, the memory may refer to non-volatile memory (NVM) that is used as persistent memory to provide each checkpoint for the program states so that the program states are restored when power is available during energy harvesting.

In some instances, the checkpoint manager 520 may be configured to cause the at least one processor 510 to perform a method operation of assigning at least one bit in a hardware bit-vector for each variable of the variables stored in memory. In some instances, the checkpoint manager 520 may be configured to cause the at least one processor 510 to perform a method operation of analyzing each variable of the variables stored in memory, e.g., after assigning the at least one bit in the hardware bit-vector.

In accordance with various implementations described herein in reference to FIGS. 1A-4 any one or more or all of these operations performed by the checkpoint manager 520 may be altered, modified, or changed to thereby provide the various specific embodiments as shown in FIGS. 1A-4. Also, each of the operations may be in the form of a logic block or module having hardware bit-vector definitions, and the logic block or module may refer to a physical layout structure associated with integrated circuitry that is included in a place and route environment for EDA.

In some implementations, as shown in FIG. 5, the computing device 504 may also include a compiler 522 (or memory compiler, or software program) that is configured to translate computer code (or source code) written in a source programming language into a target language, such as, e.g., an instruction sequence, that causes a processor to perform various operations. I.e., the compiler 522 may refer to a software program that translates source code from a high-level programming language to a lower level language, such as, e.g., assembly language, object code, or machine code, to create an executable program that causes a processor to perform various operations. Also, in some instances, the compiler 522 may be configured to perform method 400 of FIG. 4.

In some implementations, as shown in FIG. 5, the computing device 504 may also include a simulator 522 that is configured to cause the at least one processor 510 to generate one or more simulations of various integrated circuitry. The simulator 522 may be referred to as a simulating component or module and may be implemented in hardware or software. If implemented in software, the simulator 522 may be recorded or stored in memory 512 or the database 540. If implemented in hardware, the simulator 520 may be a separate processing component configured to interface with the processor 510. In some instances, the simulator 522 may refer to a SPICE simulator that is configured to generate SPICE simulations of integrated circuitry. SPICE is an acronym for Simulation Program with Integrated Circuit Emphasis, which refers to an open source analog electronic circuit simulator. Also, SPICE may refer to general-purpose software used by the semiconductor industry to check the integrity of integrated circuit designs and to predict the behavior of integrated circuit designs. Thus, in some instances, the checkpoint manager 520 may be configured to interface with the simulator 522 so as to generate timing data based on one or more simulations (including, e.g., SPICE simulations) of an integrated circuit that may be used for analyzing performance characteristics of the integrated circuit including timing data of the integrated circuit. Moreover, the checkpoint manager 520 may be configured to use various generated simulations (including, e.g., SPICE simulations) of the integrated circuitry for evaluating operational behavior and conditions thereof.

In some implementations, the computing device 504 may include one or more databases 540 configured to store and/or record various data and information related to implementing hardware bit-vector schemes and techniques in physical design. Also, in some instances, one or more database(s) 540 may be configured to store and/or record various information related to integrated circuitry, operating conditions, operating behavior and/or timing related data. Also, the database(s) 540 may be configured to store and/or record data and information related to integrated circuitry along with various timing data with respect to simulation data (including, e.g., SPICE simulation data).

In some implementations, the computing device 504 may further include energy harvesting circuitry that may experience frequent power failures, e.g., in a manner as described in reference to FIGS. 1A-1B. In this instance, the at least one processor 510 and memory 512 may be coupled to the energy harvesting circuitry, and the at least one processor 510 may also be configured to reduce the number of write operations to a log structure with the hardware bit-vector stored in a register, which may be used by the energy-harvesting circuitry to compensate for the frequent power failures. Also, in some instances, compensating for frequent power failures refers to compelling computational progress despite the frequent power failures.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device. The device may include energy harvesting circuitry that experiences power failures, and the device may include computing circuitry having a processor coupled to the energy harvesting circuitry. The processor may be configured to reduce a number of write operations to a log structure having a hardware bit-vector used by the computing circuitry to boost computational progress even with the power failures.

Described herein are various implementations of a method. The method may include tracking a program state for a number of write operations with checkpoints, and for each checkpoint, the method may include identifying variables to be stored in persistent memory that are written before a next checkpoint. The method may include assigning a bit in a hardware bit-vector for each variable of the variables to be stored in the persistent memory, and also, the method may include verifying the variables to be stored in the persistent memory.

Described herein are various implementations of a system having a processor and memory having instructions stored thereon that, when executed by the processor, cause the processor to identify a hardware bit-vector assigned to a variable stored in the memory and identify an undo log stored in the memory. The instructions may cause the processor to execute a test-and-log instruction that reads a bit of the hardware bit-vector and updates the undo log in dependence on a value of the bit of the hardware bit-vector.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device, comprising:
   energy harvesting circuitry that experiences power failures; and
   computing circuitry having a processor coupled to the energy harvesting circuitry, wherein the processor is configured to reduce a number of write operations to a log structure having a hardware bit-vector used by the computing circuitry to boost computational progress even with the power failures.

2. The device of claim 1, wherein the device refers to a battery-less energy harvesting sensor that operates intermittently when energy is available for harvesting and for producing power for load circuitry including the processor.

3. The device of claim 1, further comprising:
   non-volatile memory (NVM) that is used as persistent memory to provide a checkpoint for one or more program states so that the one or more program states are restored when power is available during energy harvesting.

4. The device of claim 3, wherein the log structure is used to ensure that the checkpoint remains consistent with respect to the one or more program states, and wherein the log structure is used to ensure that the number of write operations are restorable by writing to the hardware bit-vector.

5. The device of claim 3, wherein the hardware bit-vector is used so as to enable undo-logging, wherein the number of write operations has a first write operation, and wherein the undo-logging is only used on the first write operation after a checkpoint, and wherein the first write operation is write-specific to at least one variable associated with the first write operation.

6. The device of claim 3, wherein the hardware bit-vector is configured to track the one or more program states between multiple checkpoints.

7. The device of claim 1, wherein the hardware bit-vector refers to a compiler mapped, status flag bits or register for software log filtering of one or more program states during execution of the number of write operations.

8. The device of claim 1, further comprising power conversion circuitry that is coupled to the energy harvesting circuitry and the computing circuitry,
wherein the power conversion circuitry is configured to convert energy harvested by the energy harvesting circuitry to power for use by the computing circuitry.

9. The device of claim 1, wherein the processor is configured to:
execute a test-and-log function that reads the hardware bit-vector and updates an undo log if the hardware bit-vector is not set, wherein the test-and-log function obtains an address of each variable to be logged and a corresponding index into the hardware bit-vector, and wherein the test-and-log function refers to a single instruction or an instruction sequence provided by instruction set architecture (ISA).

10. A method, comprising:
tracking a program state for a number of write operations with checkpoints;
for each checkpoint, identifying variables to be stored in persistent memory that are written before a next checkpoint;
assigning a bit in a hardware bit-vector for each variable of the variables to be stored in the persistent memory; and
verifying the variables to be stored in the persistent memory.

11. The method of claim 10, wherein assigning the bit in the hardware bit-vector for each variable of the variables refers to mapping each variable of the variables to the bits in the hardware bit-vector.

12. The method of claim 10, wherein the persistent memory comprises non-volatile memory (NVM) that is used to provide the checkpoints for each program state.

13. The method of claim 10, wherein assigning the bit in the hardware bit-vector for each variable of the variables refers to using the hardware bit-vector to filter the number of write operations with respect to a log structure stored in the persistent memory.

14. The method of claim 13, wherein the log structure is used to ensure that the persistent memory remains consistent with respect to each program state, and wherein the log structure is used to ensure that the number of write operations are restored by writing to the persistent memory with the hardware bit-vector.

15. The method of claim 10, wherein the hardware bit-vector is used so as to enable undo-logging, wherein the number of write operations includes a first write operation, and wherein the undo-logging is only used on the first write operation after encountering a checkpoint.

16. The method of claim 10, wherein the hardware bit-vector refers to a compiler mapped, status flag register for software log filtering of each program state during execution of the number of write operations.

17. A system, comprising:
a processor; and
memory having instructions stored thereon that, when executed by the processor, cause the processor to:
identify a hardware bit-vector comprising a plurality of bits, each bit assigned to a variable stored in the memory;
identify an undo log stored in the memory; and
execute a test-and-log instruction that reads a bit of the hardware bit-vector and update the undo log in dependence on a value of the bit of the hardware bit-vector.

18. The system of claim 17, wherein the instructions cause the processor to:
if the hardware bit-vector is not set, then the test-and-log instruction updates the undo log and obtains an address of each variable to be logged and a corresponding index into the hardware bit-vector.

19. The system of claim 17, wherein:
the system refers to a battery-less energy harvesting sensor that operates intermittently when energy is available for harvesting and for producing power for the processor and the memory, and
the memory comprises non-volatile memory (NVM) that is used as persistent memory to provide each checkpoint for the program states so that the program states are restored when power is available during energy harvesting.

20. The system of claim 17, further comprising:
energy harvesting circuitry that experiences frequent power failures, wherein:
the processor and memory are coupled to the energy harvesting circuitry, and
the processor is configured to reduce the number of write operations to a log structure with the hardware bit-vector that is used by the energy-harvesting circuitry to compensate for the frequent power failures.

* * * * *